Patented Apr. 18, 1933                                            1,904,424

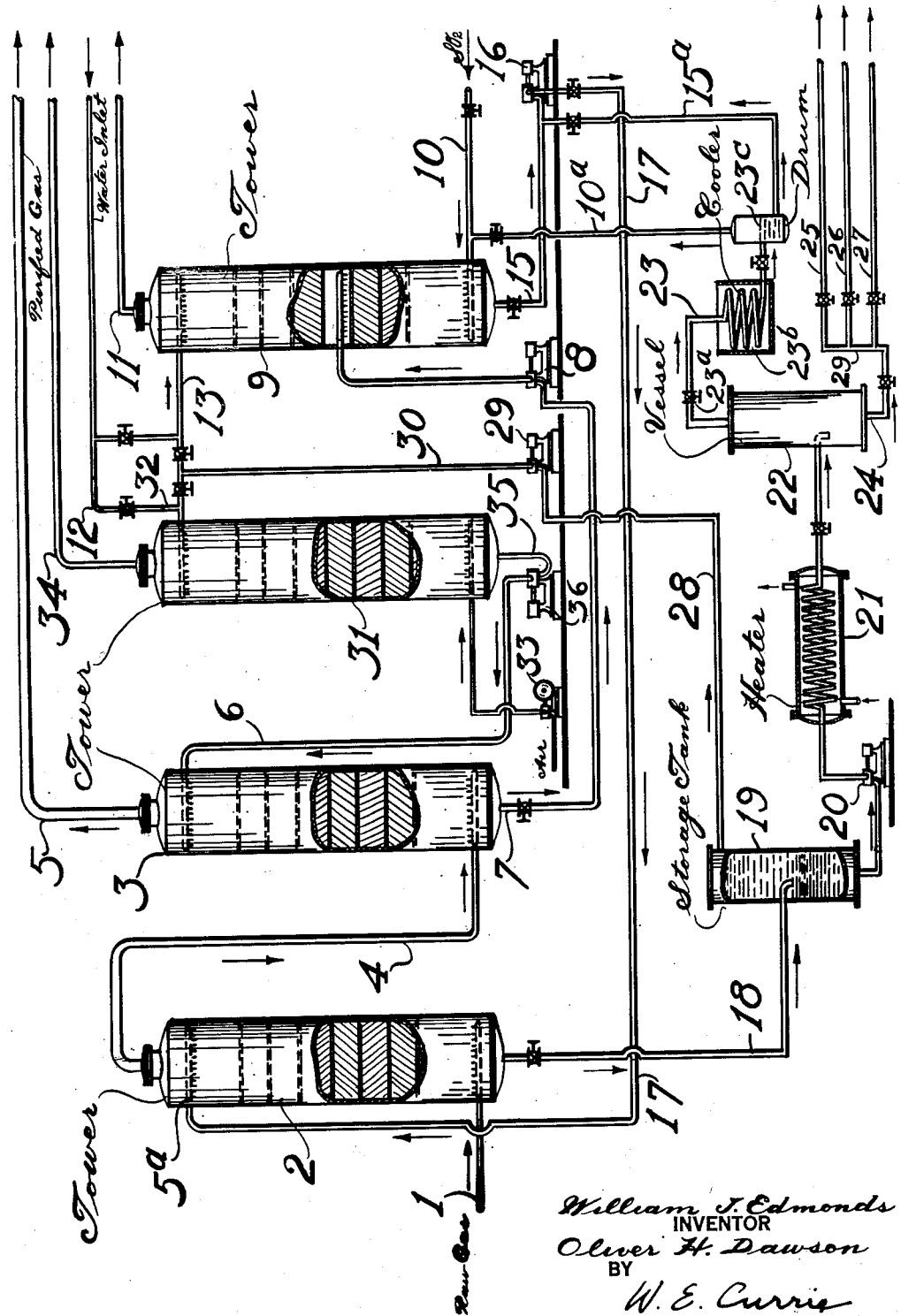

UNITED STATES PATENT OFFICE

WILLIAM J. EDMONDS AND OLIVER H. DAWSON, OF BAYTOWN, TEXAS, ASSIGNORS TO STANDARD OIL DEVELOPMENT COMPANY

PROCESS FOR THE REMOVAL OF HYDROGEN SULPHIDE FROM GAS MIXTURES AND FOR THE RECOVERY OF ELEMENTAL SULPHUR

Application filed January 21, 1930. Serial No. 422,287.

The present invention relates to the art of purifying gas or gas mixture containing hydrogen sulphide and specifically comprises the process of removing hydrogen sulphide from hydrocarbon gases, such as natural gas, refinery gas and the like. Our process will be fully understood from the following description and drawing, which illustrates the preferred form in which the operations are carried out.

The drawing is a semi-diagrammatic in sectional elevation of an apparatus suitable for the purification of gas by our improved method and indicates the flow of gas and treating liquids throughout the apparatus.

The present invention is an improvement on a previous invention fully disclosed in Serial No. 307,465 filed September 21, 1928 in the names of S. P. Coleman and Brian Mead, now Patent 1,832,448. The process disclosed in the previous application comprises a self-contained method for the removal of hydrogen sulphide from gaseous mixtures with the aid of sulphur dioxide and for the recovery of the sulphur. The present invention discloses an improved method for the recovery of the sulphur in a purified form which is highly desirable for commercial use.

Referring to the drawing, reference character 1, denotes a gas main carrying the raw gas containing hydrogen sulphide from any convenient source and discharging the gas into the base of tower 2 which may be packed with suitable means for promoting efficient contact of liquid and gas. A second tower 3 is connected to tower 2 by gas line 4 and the purified gas is removed from the top of tower 3 by a gas line 5 which is connected to any suitable storage receptacle (not shown) for accumulation and distribution of the gas. A solution of sulphur dioxide in water, which is produced in apparatus for that purpose, disclosed below, is introduced into the top of tower 2 by means of line 5a and in passing thru the tower removes substantially all of the hydrogen sulphide contained in the gas. Water or a suitable aqueous medium, substantially free of sulphur dioxide, is simultaneously fed into the top of tower 3 by line 6 and in passing downward through the tower absorbs sulphur dioxide from the gas so that the purified gas, leaving by line 5, as indicated above is substantially free from sulphur. The liquid containing sulphur dioxide in solution is removed from the base of tower 3 by line 7 and is forced, by a pump 8, into the middle of a tower 9. This tower is similar to tower 2 and 3 and is fed at the bottom with gas rich in sulphur dioxide, which may be generated by any suitable means, such as sulphur burner, pyrite roaster or the like (not shown). Water is also introduced into the top of tower 9 by lines 12 and 13 and in passing down the tower the sulphur dioxide is substantially completely removed from the gas which escapes by line 11. The solution of sulphur dioxide in water is taken by line 15 from the bottom of tower 9 and forced by pump 16 through line 17 and into tower 2 by way of line 5a as indicated above. The liquid product from tower 2 is continuously withdrawn to a separator or storage tank 19, in which the solution is allowed to accumulate and separate into two layers, the upper being substantially free from suspended sulphur and the lower containing sulphur in a more or less colloidal form. This suspension is removed either continuously or at intervals from storage tank 19 by a pump 20 forced through heater 21 and into a vessel 22 which is adapted to be maintained under superatmospheric pressure and at a temperature above the melting point of sulphur and sufficient to vaporize a large part of the moisture present on reduction of pressure. Vapor from vessel 22 is discharged through line 23 and valve 23a into the base of tower 9 and if desired, the vapor may be cooled in cooler 23b to separate a liquid condensate. The gas will then be passed out of drum 23c by way of pipe 10a into tower 9 and the liquid into line 15, by pipe 15a as shown. The molten sulphur is removed by means of a line 24 and discharged through either one of the lines 25 or 26 into suitable receptacles for the collection of sulphur of different grades of purity. Unvaporized liquid containing sulphuric acid may be removed by line 27 to storage or to the sewer. The upper or clear layer from separator 19 is removed by line 28 and forced by pump 29 through line 30 into the upper part of a tower 31 which is similar to tower 2—3 and 9. Water from line 12 may also be pumped into tower 31 by way of a branch pipe 32 and air is forced into the base of the tower by a compressor 33. The gas discharged from the top of the tower and removed by line 34 contains only a small amount of sulphur dioxide. Liquid from the base of the tower, free from sulphur dioxide or sulphurous acid, but containing other oxy-sulphur acids, is conducted by line 35 and 36 to the top of tower 3 and introduced thereinto by way of line 6 as indicated above.

In the operation of our process it will be noted that an excess of sulphur dioxide is maintained in tower 2 which is the case in the previously noted application Serial No. 307,465. The gas removed therefrom contains substantially no hydrogen sulphide, but it does contain a substantial quantity of sulphur dioxide. This is removed in tower 3 so that the outgoing hydrocarbon gas is substantially free of both hydrogen sulphide and sulphur dioxide. The liquid from tower 2 is separated into a clear solution which comprises sulphurous acid and various oxy-sulphur acids, such as thiosulphuric and thionic acids and is recycled through the system comprising towers 2, 3, 31 and 9. The lower layer which comprises a suspension of colloidal sulphur is heated and maintained for a prolonged period at an elevated temperature and under pressure above atmospheric in the vessel 22. We have found it desirable to subject the mass to a temperature of about 275 deg. F. for at least one and one half hours, and under pressure of about 75 pounds per square inch, or above, but the time may be decreased at higher temperature and pressures. At the end of this period the valve 23a is opened allowing substantially all of the water with sulphur dioxide to be flashed into vapor form and passed into the base of tower 9. Elemental sulphur in a molten condition settles into three layers, the upper and the lower of which contain various impurities such as chlorides, iron and silica and volatile organic materials. The middle layer is sulphur of high purity and may be sold as such. We prefer to use the upper and lower layer in the sulphur burner to regenerate sulphur dioxide and under most conditions there is sufficient impure sulphur for this purpose. A small quantity of sulphuric acid is produced by the heat treatment. This is preferably discarded.

As an example of the operation of our improved process we have purified the gas containing about 7% $H_2S$ and producing a gas substantially free of sulphur. The liquid flowing into the top of tower 2 comprises a solution about .10 normal thiosulphuric acid and about .025 normal sulphurous acid. The liquid removed from the bottom of the tower is about .010 normal sulphurous acid and containing polythionic acids.

We have been able to recover all of the sulphur contained in the suspension in the form of free sulphur and the middle layer of this which composes about 75% of the total, has a purity of 95.5%. Of this pure sulphur, an amount equal to about 80% of the sulphur originally present in the raw gas is left after a sufficient quantity of sulphur has been reserved for burning to satisfy the requirements of the process.

The present invention is not to be limited by any theory of the chemical reactions involved nor to any details which may have been given for purely illustrative purposes, in the above description, but only by the following claims in which we wish to claim all novelty inherent in our invention.

We claim:

1. An improved process for the recovery and purification of the sulphur which results from the desulphurization of gas by sulphur dioxide, comprising withdrawing a liquid suspension of elemental sulphur formed by such desulphurization, heating it to an elevated temperature above the melting point of sulphur for a prolonged period, removing water and sulphur dioxide and separately removing from the three layers formed, separate fractions of sulphur one of which is substantially pure sulphur.

2. Process according to claim 1, in which the suspension of elemental sulphur is maintained at an elevated temperature and under super-atmospheric pressure for a prolonged period and water is removed by reduction of pressure and vaporization.

3. Process according to claim 1, in which the suspension of sulphur is heated for at least one and one half hours at 275 deg. F.

4. Process according to claim 1, in which the liquid containing suspended sulphur is allowed to settle into two layers, the upper being substantially free of elemental sulphur and the lower containing substantially all of the elemental sulphur and such lower layer above is subjected to the heat treatment.

5. Process according to claim 1, in which heat treatment is accomplished under super-atmospheric pressure whereby polythionic acids are converted into sulphur dioxide and such sulphur dioxide is returned for treatment of fresh gas.

6. An improved process for treatment of hydrocarbon gas for removal of hydrogen sulphide, comprising washing the gas in a reaction zone with an aqueous solution containing an excess of sulphur dioxide over that required to react with the hydrogen sulphide, scrubbing the residual gas in an absorption zone with water to remove sulphur dioxide, settling the liquid from the reaction zone, whereby one layer containing suspended sulphur is obtained, together with another layer free of elemental sulphur, recovering the sulphur in three fractions one of which is substantially pure elemental sulphur by steps including the melting of the same, aerating the liquor free from elemental sulphur, and returning this aerated liquor to the absorption zone.

WILLIAM J. EDMONDS.
OLIVER H. DAWSON.